(12) United States Patent
Hayakawa et al.

(10) Patent No.: US 9,260,330 B2
(45) Date of Patent: Feb. 16, 2016

(54) FLUID PURIFYING APPARATUS

(71) Applicants: Kenichi Hayakawa, Kanagawa (JP);
Shogo Suzuki, Kanagawa (JP);
Hideyuki Miyazawa, Kanagawa (JP);
Kimio Aoki, Kanagawa (JP); Noriaki Okada, Kanagawa (JP); Aya Utsuki, Kanagawa (JP); Yuu Zama, Kanagawa (JP); Toshiyuki Mutoh, Kanagawa (JP);
Shigeru Yamada, Kanagawa (JP);
Makito Nakashima, Kanagawa (JP)

(72) Inventors: Kenichi Hayakawa, Kanagawa (JP);
Shogo Suzuki, Kanagawa (JP);
Hideyuki Miyazawa, Kanagawa (JP);
Kimio Aoki, Kanagawa (JP); Noriaki Okada, Kanagawa (JP); Aya Utsuki, Kanagawa (JP); Yuu Zama, Kanagawa (JP); Toshiyuki Mutoh, Kanagawa (JP);
Shigeru Yamada, Kanagawa (JP);
Makito Nakashima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 168 days.

(21) Appl. No.: 13/959,926

(22) Filed: Aug. 6, 2013

(65) Prior Publication Data
US 2014/0048464 A1    Feb. 20, 2014

(30) Foreign Application Priority Data

Aug. 17, 2012  (JP) .................................. 2012-180910
Jun. 10, 2013  (JP) .................................. 2013-121706

(51) Int. Cl.
*C02F 1/72* (2006.01)
*B01J 8/02* (2006.01)
(Continued)

(52) U.S. Cl.
CPC ............... *C02F 1/725* (2013.01); *B01J 8/0285* (2013.01); *B01J 8/067* (2013.01); *B01J 8/087* (2013.01);
(Continued)

(58) Field of Classification Search
CPC ............ C02F 1/02; C02F 1/025; C02F 1/722; C02F 1/725; C02F 1/727; C02F 1/74; C02F 1/78; C02F 11/08; C02F 11/086; C02F 11/083; C02F 2201/007; C02F 2101/30; C02F 2201/003; C02F 2201/004; C02F 2201/005; C02F 2209/02; C02F 2209/03; C02F 2209/10; C02F 2301/066; C02F 2301/08; B01D 21/02; B01J 8/0285; B01J 8/067; B01J 8/087; B01J 2219/0015; B01J 2219/00094; B01J 2208/00132
See application file for complete search history.

(56) References Cited

U.S. PATENT DOCUMENTS 5,461,648 A * 10/1995 Nauflett et al. ............... 376/305
5,492,634 A *  2/1996 Hong et al. .................... 210/761
(Continued)

FOREIGN PATENT DOCUMENTS

| JP | 2001-009482 | 1/2001 |
| WO | WO2011/139225 | 11/2011 |
| WO | WO2012/048600 | 4/2012 |

OTHER PUBLICATIONS

European Search report dated Oct. 31, 2013 in corresponding European patent application No. 13 17 9330.9.
(Continued)

*Primary Examiner* — Lucas Stelling
(74) *Attorney, Agent, or Firm* — Cooper & Dunham LLP

(57) ABSTRACT

A fluid purifying apparatus that purifies fluid containing organic matter has a reactor including a first transfer part that receives the fluid from outside and transfers the fluid in a vertical direction from an upper side to a lower side while heating and pressurizing the fluid and mixing the fluid with an oxidant, a second transfer part that receives the fluid that has passed through the first transfer part and transfers the fluid in the vertical direction from the lower side to the upper side, and a partition member that partitions an upper part of the reactor into the first transfer part and the second transfer part, and a solid storage part that communicates with the first transfer part and the second transfer part below the partition member and receives solid matter contained in the fluid that settles while the fluid is transferred.

10 Claims, 15 Drawing Sheets

(51) Int. Cl.
- B01J 8/06 (2006.01)
- B01J 8/08 (2006.01)
- C02F 11/08 (2006.01)
- C02F 1/00 (2006.01)
- C02F 1/74 (2006.01)
- C02F 1/78 (2006.01)
- C02F 101/30 (2006.01)
- B01D 21/02 (2006.01)

(52) U.S. Cl.
CPC .............. *C02F 11/086* (2013.01); *B01D 21/02* (2013.01); *B01J 2208/00132* (2013.01); *B01J 2219/0015* (2013.01); *B01J 2219/00094* (2013.01); *C02F 1/008* (2013.01); *C02F 1/722* (2013.01); *C02F 1/727* (2013.01); *C02F 1/74* (2013.01); *C02F 1/78* (2013.01); *C02F 2001/007* (2013.01); *C02F 2101/30* (2013.01); *C02F 2201/003* (2013.01); *C02F 2201/004* (2013.01); *C02F 2201/005* (2013.01); *C02F 2209/02* (2013.01); *C02F 2209/03* (2013.01); *C02F 2301/066* (2013.01); *C02F 2301/08* (2013.01)

(56) References Cited

U.S. PATENT DOCUMENTS

| | | |
|---|---|---|
| 2009/0266772 A1* | 10/2009 | Martinez de la Ossa Fernandez et al. .............................. 210/761 |
| 2012/0225771 A1 | 9/2012 | Miyazawa et al. |
| 2013/0105378 A1 | 5/2013 | Wang et al. |
| 2013/0134106 A1 | 5/2013 | Suzuki et al. |
| 2013/0153477 A1 | 6/2013 | Suzuki et al. |

OTHER PUBLICATIONS

"Removing Solids From Supercritical Water", NTIS Tech Notes, US Department of Commerce. Springfield, VA, US, Aug. 1, 1992, p. 568.

* cited by examiner

FLUID PURIFYING APPARATUS

BACKGROUND OF THE INVENTION

1. Field of the Invention

The present invention relates to a fluid purifying apparatus that includes a reactor that purifies a purifying target fluid such as waste liquid by applying pressure and heat to the purifying target liquid while mixing an oxidant such as air with the purifying target fluid and decomposing organic matter contained in the purifying target fluid through an oxidation reaction.

2. Description of the Related Art

A method of conducting biological treatment using an activated sludge has been generally used as a method for purifying liquid wastes such as human waste, sewage, domestic wastewater from residential areas, livestock excreta, and effluents from food processing factories. However, the method is not conducive to treating liquid wastes containing a high-concentration organic solvent, which impede activities of microorganisms in the activated sludge, without reducing the concentration, or treating liquid wastes containing fine particles of non-biodegradable plastics. Also, the method is not conducive to treating waste liquids containing a high content of persistent organic matter such as oil that cannot be easily decomposed by microorganisms.

Meanwhile, technological developments are recently being made with respect to a fluid purifying apparatus that purifies waste liquid by applying heat and pressure to a mixed fluid of the liquid waste and an oxidant such as air, and decomposing organic matter contained in the mixed fluid through oxidative decomposition. An example of such a fluid purifying apparatus is disclosed in Japanese Laid-Open Patent Publication No. 2001-9482 (referred to as "Patent Document 1" hereinafter). The fluid purifying apparatus applies heat and pressure to the mixed fluid of waste liquid and air inside a reactor and causes water contained in the mixed fluid to be in a supercritical state. Supercritical water has properties between those of liquid and gas. Supercritical water is created under a condition where the temperature is raised above the critical temperature of water and the pressure is raised above the critical pressure of water. In the reactor, organic matter may be hydrolyzed in a mixture of supercritical water and air, or organic matter may undergo oxidative decomposition in the presence of oxygen.

By implementing such a technique that involves oxidative decomposition of organic matter contained in a mixed fluid by applying a high temperature and a high pressure to water contained in the mixed fluid and converting the water into supercritical water, purification may be performed on waste liquids that could not be purified through biological treatment such as waste liquids containing a high concentration of organic solvent, waste liquids containing plastic particles, and waste liquids containing persistent organic matter, for example.

The inventors of the present invention are developing a new fluid purifying apparatus that is capable of inducing oxidative decomposition of organic matter in a reactor by applying a pressure that is lower than the critical pressure of water to a mixed fluid while heating the mixed fluid to a high temperature so that the water contained in the mixed fluid is turned into a high-temperature and high-pressure vapor state. The inventors have found through their research and development efforts that such a fluid purifying apparatus is also capable of purifying waste liquids containing a high concentration of organic solvent, waste liquids containing plastic particles, and waste liquids containing persistent organic matter, for example.

However, in the case of purifying a waste liquid containing a high content of inorganic suspended solids as the purifying target fluid using the above-described fluid purifying apparatus or the fluid purifying apparatus disclosed in Patent Document 1, for example, cleaning operations that involve halting operations of the fluid purifying apparatus to clean the interior of the reactor have to be frequently conducted.

Specifically, conventional reactors include a vertical type reactor such as that illustrated in FIG. 1 of Patent Document 1, and a horizontal type reactor such as that illustrate in FIG. 2 of Patent Document 1. The vertical type reactor is arranged to have its longitudinal side extend in a substantially vertical direction. The vertical type reactor is configured to receive waste liquid from its upper side, decompose organic matter contained in the waste liquid while mixing an oxidant with the waste liquid and transporting the waste liquid from the upper side towards the lower side, and discharge the purified fluid to a drain pipe that is connected to the lower end of the tank. The horizontal type reactor is arranged to have its longitudinal side extend in a substantially horizontal direction. The horizontal type reactor is configured to receive waste liquid from one of its horizontal ends, decompose organic matter contained in the waste liquid while the mixing an oxidant with the waste liquid and transporting the waste liquid from the one horizontal end to the other horizontal end, and discharge the purified fluid to a transfer pipe that is connected to the other horizontal end.

In either of the above types of reactors, water contained in the waste liquid is converted into supercritical water or high-temperature and high-pressure vapor immediately after the waste liquid is introduced into the reactor. In this case, a large amount of inorganic suspended solids contained in the waste liquid are precipitated, and the inorganic solids settle and accumulate at the bottom of reactor. In the vertical type reactor, the inorganic solids accumulated at the bottom of the reactor may clog the drain pipe connected to the lower end of the reactor to thereby hinder effective transfer of the supercritical water or high-temperature and high-pressure vapor within the reactor. In the horizontal type reactor, precipitation of the inorganic solids occurs largely near the one horizontal end from which the waste liquid is introduced. Thus, eventually, the inorganic solids may pile up from the bottom to the ceiling of the tank at the one horizontal end to thereby clog the tank itself. In such case, it may be difficult to effectively transfer the supercritical water or the high-temperature and high-pressure vapor within the reactor from the one horizontal end to the other horizontal end. Thus, operations of the fluid purifying apparatus have to be halted on a frequent basis to conduct cleaning operations on the reactor.

In view of the above, suspended solids may be removed in advance through coagulation, sedimentation, or sieving, for example, to reduce the concentration of inorganic suspended solids contained in the waste liquid. In this way, the amount of precipitation of inorganic solids within the reactor may be reduced and the frequency rate at which cleaning operations have to be conducted may be reduced. However, removing suspended solids in advance may preclude efficient use of the decomposition energy of organic matter contained in the waste liquid and costs may be raised as a result.

Specifically, suspended solids contained in waste liquid may generally be divided into inorganic suspended solids and organic suspended solids. When removal processes such as coagulation, sedimentation, or sieving is performed, the inorganic suspended solids as well as the organic solids are removed. Organic suspended solids may be dissolved into supercritical water or high-temperature and high-pressure vapor under a high temperature and a high pressure and may be oxidized and decomposed thereafter, or even if the organic suspended solids are separated from water and precipitated as organic solids, they may be burned in the presence of oxygen. Thus, organic suspended solids are not likely to be accumulated within the reactor. Accordingly, even if a large amount of organic suspended solids exist within the reactor, the organic suspended solids are not likely to contribute to clogging of the reactor. Moreover, because organic suspended solids generate heat upon undergoing oxidative decomposition within the reactor, they may contribute to maintaining the temperature within the reactor at a high temperature so that heating energy for heating the reactor by heating means such as a heater may be conserved. Thus, removing the organic suspended solids before introducing the waste liquid into the reactor may have a detrimental effect of increasing the heating energy required within the reactor which may in turn lead to a cost increase.

SUMMARY OF THE INVENTION

It is a general object of at least one embodiment of the present invention to provide a fluid purifying apparatus that substantially obviates one or more problems caused by the limitations and disadvantages of the related art. It is one specific object of at least one embodiment of the present invention to provide a fluid purifying apparatus that is capable of using the decomposition energy of organic suspended solids within a reactor to maintain a high temperature within the reactor while reducing the frequency at which cleaning operations have to be performed on the reactor.

According to one embodiment of the present invention, a fluid purifying apparatus includes a reactor that purifies a fluid to be purified that contains organic matter, the reactor being configured to mix an oxidant with the fluid while heating and pressurizing the fluid to induce decomposition of the organic matter. The reactor includes a first transfer part that receives the fluid from outside and transfers the fluid in a vertical direction from an upper side to a lower side while heating and pressurizing the fluid and mixing the fluid with the oxidant; a second transfer part that receives the fluid that has passed through the first transfer part and transfers the fluid in the vertical direction from the lower side to the upper side; a partition member that partitions at least an upper part of the reactor into the first transfer part and the second transfer part; and a solid storage part that communicates with the first transfer part and the second transfer part and is arranged below the partition member with respect to the vertical direction. The solid storage part is configured to receive solid matter contained in the fluid that settles while the fluid is transferred through the first transfer part and the second transfer part.

According to an aspect of the present invention, fluid to be purified that is introduced into the first transfer part of the reactor is heated and pressurized within the first transfer part so that water contained in the fluid is converted into supercritical water or high-temperature and high-pressure vapor, for example. At this time, inorganic suspended solids contained in the fluid are precipitated from the fluid as inorganic solids and settle toward the lower side in the vertical direction. The inorganic solids enter the solid storage part that communicates with the first transfer part and is arranged below the first transfer part. In this way, the inorganic solids accumulate within the solid storage part. On the other hand, the fluid that has been converted into supercritical water or high-temperature and high-pressure vapor moves in the vertical direction from the upper side to the lower side to exit the first transfer part and thereafter changes its course to move in the vertical direction from the lower side to the upper side to enter the second transfer part. Then, the fluid moves in the vertical direction from the lower side to the upper side within the second transfer part to be discharged from the reactor. The accumulation level of the inorganic solids accumulated at the solid storage part gradually rises over time. However, the inorganic solids would not confine the flow paths of the first transfer part or the second transfer as long as the accumulation level of the inorganic solids is below the height of the upper end of the solid storage part. That is, the fluid to be purified and the oxidant may be efficiently transferred through the first transfer part and the second transfer part while the accumulation level of the inorganic solids is rising merely within the solids storage part. Accordingly, by arranging the solid storage part to have an adequately large volume, the frequency at which cleaning operations are performed on the reactor may be reduced without performing a removal process of removing suspended solids from fluid to be purified before introducing the fluid into the reactor. Further, by introducing the fluid that has not undergone such a removal process into the reactor, the decomposition energy of organic suspended solids contained in the fluid may be used to maintain a high temperature within the reactor.

DESCRIPTION OF THE PREFERRED EMBODIMENTS

In the following, embodiments of the present invention are described with reference to the accompanying drawings.

Figure 1:
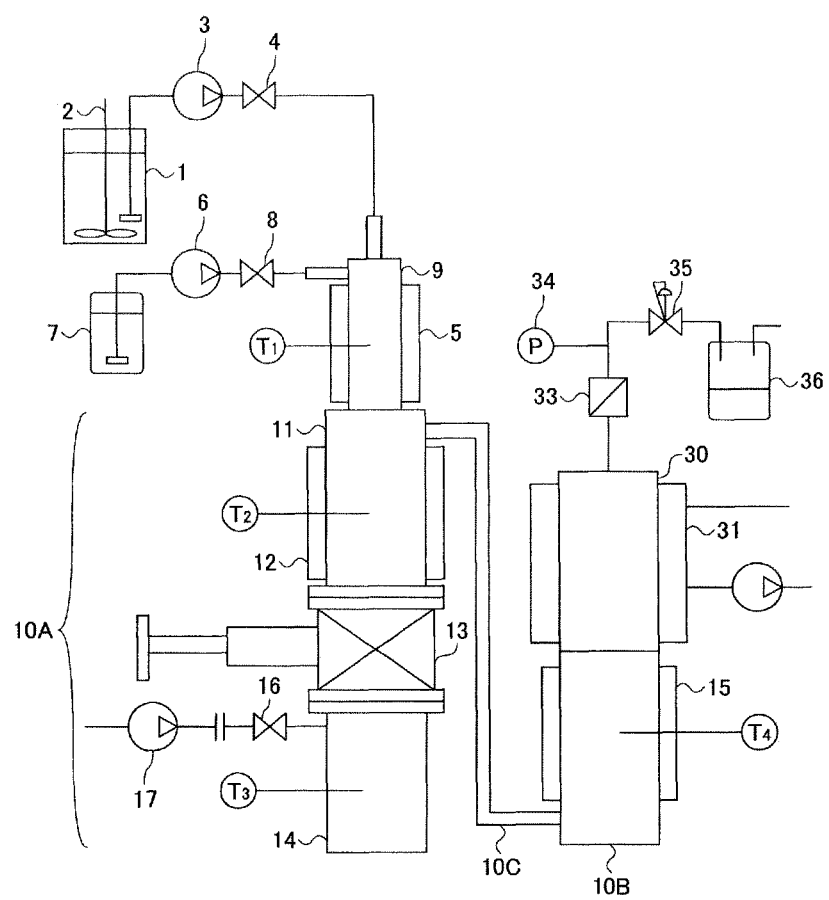
FIG. 1 is a schematic view of an overall configuration of a fluid purifying apparatus according to a first embodiment of the present invention.

First, an overall configuration of a fluid purifying apparatus according to a first embodiment of the present invention is described. FIG. 1 is a schematic view of the overall configuration of the fluid purifying apparatus according to the first embodiment. The fluid purifying apparatus illustrated in FIG. 1 includes a raw water tank 1, an agitator 2, a raw water feed pump 3, a raw water inlet valve 4, a preheating device 5, an oxidant pressure-feed pump 6, an oxidant tank 7, an oxidant inlet valve 8, and a preheating part 9, for example. The fluid purifying apparatus also includes a reactor 10 (10A, 10B) a first heating device 12, a second heating device 15, a storage part opening valve 16, a booster pump 17, a cooling part 30, a heat exchange pump 32, a filter 33, an outlet pressure gauge 34, an outlet valve 35, a gas-liquid separator 36, and a controller (not shown). The reactor 10 includes a first reactor 10A and a second reactor 10B. The first reactor 10A includes a transfer part 11, a valve part 13, and a solid storage part 14.

The controller includes a corresponding number of power supply circuits, each comprising an earth leakage breaker, a magnetic switch, and a thermal relay, for example, which are provided individually for the agitator 2, the raw water feed pump 3, the preheating device 5, the oxidant pressure-feed pump 6, the first heating device 12, the second heating device 15, the booster pump 17, and the heat exchange pump 32. The controller is configured to perform individual on/off power control of these devices by turning on/off the magnetic switches of the power supply circuits based on control signals from a programmable sequencer.

The outlet pressure gauge 34 outputs a voltage having a certain value according to a pressure detection result. Also, a thermometer $T_1$ outputs a voltage having a certain value according to the temperature within the preheating part 9. Also, a thermometer $T_2$ outputs a voltage having a certain value according to the temperature within the transfer part 11 of the first reactor 10A. Also, a thermometer $T_3$ outputs a voltage having a certain value according to the temperature within the solid storage part 14 of the first reactor 10A. Also, a thermometer $T_4$ outputs a voltage having a certain value according to the temperature within the second reactor 10B. The output voltages from these measuring devices are each converted into digital data by an A-D (analog-to-digital) converter (not shown), after which the digital data are input as sensing data to the programmable sequencer. The programmable sequencer controls drive operations of the various devices based on the sensing data.

The raw water tank 1 stores liquid waste containing organic matter of relatively high molecular weight, in an untreated state. The liquid waste may include at least one of organic-solvent liquid waste, paper-manufacturing liquid waste produced by a paper manufacturing process, and toner manufacturing liquid waste produced by a toner manufacturing process. The paper-manufacturing liquid waste and the toner-manufacturing liquid waste may contain persistent organic matter.

The agitator 2 stirs the liquid waste corresponding to a purifying target fluid to achieve uniform dispersion of suspended solids contained in the liquid waste and thus ensure uniform organic matter concentrations. The liquid waste within the raw water tank 1 is continuously pressure-fed under high pressure into the preheating part 9 through the raw water inlet valve 4 by the raw water feed pump 3, which comprises a high-pressure pump. The raw water inlet valve 4 functions as a check valve that allows the flow of the waste liquid being pressure-fed from the raw water geed pump 3 to the preheating part 9 while preventing the flow of the waste liquid in the reverse direction.

The oxidant pressure-feed pump 6 draws in the oxidant stored in the oxidant tank 7 through suction, compresses the oxidant to a pressure approximately equivalent to the inflow pressure of the waste liquid, and feeds the compressed oxidant to the preheating part 9 via the oxidant inlet valve 8. The oxidant that has been fed from the oxidant pressure-feed pump 6 at high pressure enters the preheating part 9 via the oxidant inlet valve 8.

The oxidant inlet valve 8 acts as a check valve for allowing the flow of the oxidant from the oxidant pressure-feed pump 6 to the preheating part 9 while preventing the flow of the oxidant in the reverse direction. An inflow pressure of the oxidant from driving the oxidant pressure-feed pump 6 is determined based on the stoichiometric amount of oxygen required for complete oxidation of the organic matter in the liquid waste. More specifically, the amount of oxygen required for the complete oxidation of the organic matter is calculated based on organic matter concentrations, nitrogen concentrations and phosphorus concentrations in the liquid waste, such as COD (Chemical Oxygen Demand), total nitrogen (TN) and total phosphorus (TP) of the liquid waste, for example, and the inflow pressure of the oxidant is set based on the calculation results.

The inflow pressure of the oxidant is preferably set by an operator. However, in a case where the type of the organic matter contained in the liquid waste is stable over time and there is relatively good correlation between physical properties such as turbidity, light transmittance, electrical conductivity and specific gravity and the amount of oxygen, the programmable sequencer may be configured to automatically control the inflow pressure, based on results obtained by a sensor detecting the physical properties, for example. The oxidant may be any one of hydrogen peroxide water, air, an oxygen gas, or an ozone gas, or a mixture of two or more of the above, for example.

The preheating device 5 is fixed to the outer wall of the preheating part 9 so that the oxidant or liquid waste that flows into the preheating part 9 may be heated by the preheating device 5 via the outer wall of the preheating part 9. Then, the preheated oxidant or liquid waste is introduced into the transfer part 11 of the first reactor 10A. The thermometer $T_1$ for detecting the temperature of the oxidant or the liquid waste inside the preheating part 9 is arranged at the preheating part 9. The programmable sequencer performs power supply on/off control operations with respect to the preheating device 5 in order to maintain the temperature detection result of the thermometer $T_1$ around a predetermined target temperature.

The pressure of mixed fluid inside the reactor 10 including the first reactor 10A and the second reactor 10B may be controlled to be within a range of 0.5 to 30 MPa (preferably 5 to 30 MPa), for example. The pressure within the reactor 10 is adjusted by the outlet valve 35 as is described in detail below. The outlet valve 35 is configured to maintain the pressure within the reactor 10 around a predetermined threshold value by automatically opening to discharge the mixed fluid within the reactor 10 to the exterior when the pressure within the reactor 10 goes above the threshold value.

The temperature of the mixed fluid within the reactor 10 may be within a range of 100-700° C. (preferably 200-550° C.). The temperature of the mixed fluid may be adjusted by performing on/off control operations with respect to the first heating device 12, which is fixed to the outer wall of the transfer part 11 of the first reactor 10A, or the second heating device 15, which is fixed to the outer wall of the second reactor. An embodiment of the present invention may be implemented under a condition in which the temperature is at least 374.2° C. and the pressure is at least 22.1 MPa, for example. In this case, the temperature may be above the critical temperature of water and the pressure may be above the critical pressure of water so that water contained in the mixed fluid may be converted into supercritical water, which has properties between those of liquid and gas. In the presence of supercritical water, organic matter contained in the mixed fluid easily dissolves with the supercritical water and easily comes into contact with air so that oxidative decomposition of the organic matter may be accelerated.

Alternatively, an embodiment of the present invention may be implemented under a condition in which the temperature is at least 200° C. (preferably at least 374.2° C.) and the pressure is a relatively high pressure below 22.1 MPa (preferably 10 MPa or higher). In this case, the water contained in the mixed fluid within the reactor 10 may be converted into a high-temperature and high-pressure vapor state.

The mixed fluid within the reactor 10 may be heated by the first heater 12, which is fixed to the outer wall of the first transfer part 11 of the first reactor 10A, or the second heater 15, which is fixed to the outer wall of the second reactor 10B, so that the temperature inside the reactor 10 may be raised. Further, the temperature inside the reactor 10 may be raised by the heat generated by the oxidative decomposition of organic matter within the reactor 10. In a case where the liquid waste contains a high concentration of organic matter, the large amount of heat generated by the oxidative decomposition of the organic matter may be enough to raise the temperature of the mixed fluid to the desired temperature. In such case, heating operations by the first heating device 12 and the second heating device 15 may only be performed during initial launching of the fluid purifying apparatus, and the power of the first heating device 12 or the second heating device 15 may be turned off once oxidative decomposition of the organic matter starts.

By raising the temperature and pressure of the mixed fluid within the reactor 10 to a high temperature and a high pressure, oxidative decomposition of organic matter and/or ammonia nitrogen contained in the mixed fluid may be induced. The mixed fluid containing the decomposed organic matter and/or ammonia nitrogen is then transferred from the reactor 10 to the cooling part 30. The cooling part 30 has the heat exchanger 31 arranged at its outer wall. The heat exchanger 31 has an outer pipe arranged over the outer wall of the cooling part 30 and has the space between the outer tube and the cooling part 30 filled with a heat exchange fluid such as water. In this way, the heat exchanger 31 induces heat exchange between the outer wall of the cooling part 30 and the heat exchange fluid. During operation of the reactor 10, purified fluid at an extremely high temperature flows into the interior of the cooling part 30, and as a result, a large amount of heat is transferred from the cooling part 30 to the heat exchange fluid thereby causing the heat exchange fluid to be heated.

The direction in which the heat exchange fluid within the heat exchanger 31 is transferred is arranged to be the reverse of the direction in which the purified fluid is transferred within the cooling part 30 to implement the so-called counter flow heat exchange. Specifically, the purified fluid is arranged to flow vertically from the lower side to the upper side within the cooling part 30 whereas the heat exchange fluid is arranged to flow vertically from the upper side to the lower side within the heat exchanger 31. The flow of the heat exchange fluid is enabled by driving the heat exchange pump 32 that is configured to draw in the heat exchange fluid by suction and feed the heat exchange fluid to a generator (not shown). The generator is configured to generate electricity by rotating a turbine using an air current that is generated upon converting the heat exchange fluid, which is at a heightened pressure as a result of being heated, from a liquid state to a gas state.

The reactor 10 includes the thermometer $T_2$ for detecting the temperature within the transfer part 11 of the first reactor 10A, the thermometer $T_3$ for detecting the temperature within the solid storage part 14 of the first reactor 10A, and the thermometer $T_4$ for detecting the temperature within the second reactor 10B. The programmable sequencer of the controller is configured to turn off power supply to the first heating device 12 when one of the detection result of the thermometer $T_2$ or the detection result of the thermometer $T_3$ reaches above a predetermined upper limit temperature. Also, the programmable sequencer of the controller is configured to turn off power supply to the second heating device 15 when the detection result of the thermometer $T_4$ reaches above a predetermined upper limit temperature. In this way, a waste of energy resources may be prevented.

The purified fluid that has passed through the cooling part 30 passes the filter 33 and the outlet valve 35, after which the pressure of the purified fluid abruptly decreases to thereby cause a change in the phase of the water contained in the purified fluid from the supercritical state or the high-temperature and high-pressure vapor state to the liquid state. On the other hand, the phased of oxygen and/or nitrogen contained in the purified fluid is changed from the supercritical state to the gas state. The purified fluid is then separated into treated liquid and gas by the gas-liquid separator 36. The treated liquid is then stored in a treated liquid tank (not shown), and the gas is discharged to the atmosphere.

The treated liquid obtained in the present embodiment has substantially all organic matter removed including persistent organic matter such as phenol that cannot be removed through biological treatment using an active sludge, for example. Thus, the treated liquid contains virtually no suspended solids or organic matter. The treated liquid may merely contain a slight amount of inorganic matter that could not be completely decomposed. The treated liquid may be reused as industrial water without undergoing any further treatment depending on its usage. Also, when the treated liquid is filtered by an ultrafiltration membrane, the treated liquid may be used as an LSI cleaning liquid, for example. The gas separated by the gas-liquid separator 36 has carbon dioxide, nitrogen gas, and oxygen gas as main ingredients.

In the following, further features of the fluid purifying apparatus according to the present embodiment are described.

Figure 2:
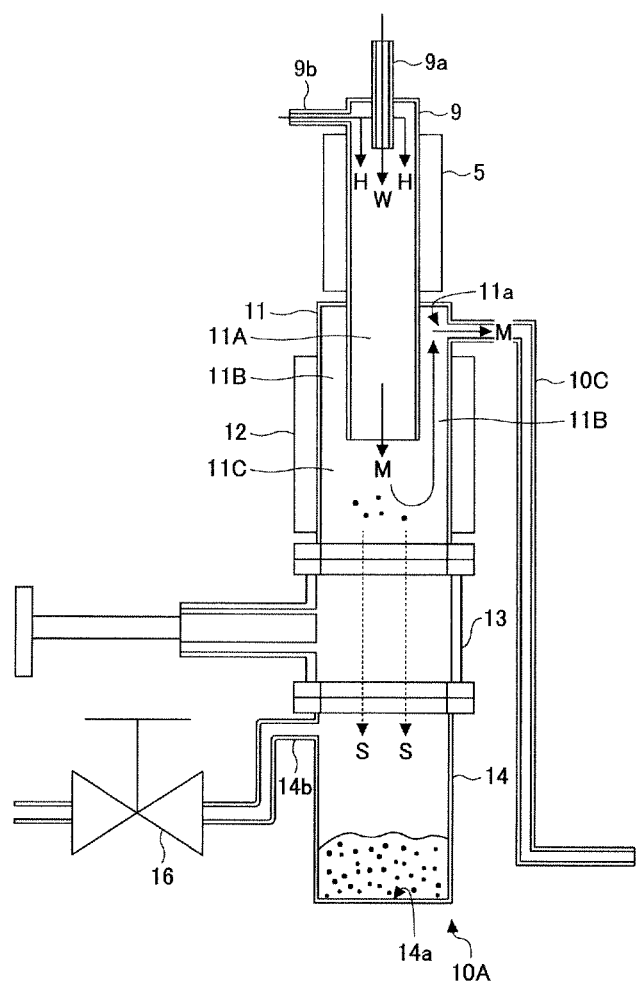
FIG. 2 is a vertical cross-sectional view of a first reactor and a preheating part of the fluid purifying apparatus according to the first embodiment.

FIG. 2 is a vertical cross-sectional view of the preheating part 9 and the first reaction rank 10A of the fluid purifying apparatus according to the first embodiment. The preheating part 9 and the first reactor 10A both have pipe structures that extend in the vertical direction. The first reactor 10A includes the transfer part 11 that is arranged at an upper part, the valve part 13 comprising a gate valve that is arranged at a middle part, and the solid storage part 14 that is arranged at a lower part of the first reactor 10A with respect to the vertical direction. The lower end portion of the pipe structure of the preheating part 9 is inserted into the upper end portion of the transfer part 11.

The inner diameters of the transfer part 11, the valve part 13, and the solid storage part 14 of the first reaction rank 10A are arranged to be substantially the same, and the transfer part 11, the valve part 13, and the solid storage part 14 are arranged in the vertical direction to communicate with each other. The outer diameter of the preheating part 9 is arranged to be substantially smaller than the inner diameter of the transfer part 11. Thus, a tubular space is formed between the inner wall of the transfer part 11 and the outer wall of the preheating part 9 that is inserted into the upper end portion of the transfer part 11. To form such a tubular space with adequate thickness, the inner diameter of the transfer part 11 is preferably arranged to be at least two times the outer diameter of the preheating part 9.

The preheating part 9 includes a liquid waste receiving part 9a for receiving liquid waste W and an oxidant receiving part 9b for receiving an oxidant H. The liquid waste W in the liquid waste receiving part 9a has already passed through the raw water inlet valve 4 and is therefore raised to a predetermined pressure. Also, the oxidant H in the oxidant receiving part 9b has already passed the oxidant inlet valve 8 and is therefore raised to a predetermined pressure. The pressurized (high-pressure) liquid waste W and oxidant H are mixed with each other inside the preheating part 9 to become mixed fluid M while being preheated by the preheating device 5, which is fixed to the outer wall of the preheating part 9. The mixed fluid M moves vertically from the upper side of the preheating part 9 to the lower side to enter the first reactor 10A from the center portion of the transfer part 11.

The mixed fluid M that has entered the transfer part 11 is heated further by the heating device 12 that is fixed to the outer wall of the transfer part 11 and the heat of the mixed fluid that is already accommodated within the transfer part 11. In this way, the water contained in the mixed fluid M is converted from the liquid state to the supercritical state or the high-temperature and high-pressure vapor state and its volume substantially increases as a result. In this case, inorganic solids suspended in the water are precipitated from the water as inorganic solids S. Then, the inorganic solids S settle by gravity toward the lower side. On the other hand, organic suspended solids dissolve with the supercritical water or the high-temperature and high-pressure vapor and are mixed into the mixed fluid M.

In the first reactor 10A, the transfer part 11 has an opening arranged at its upper end that receives the lower end portion of the preheating part 9, which acts as an introduction pipe for introducing the liquid waste W into the transfer part 11. The opening at the upper end of the transfer part 11 acts as a receiving port for receiving the liquid waste W that is introduced into the first reactor 10A. The bottom face 14a of the solid storage part 14 is disposed beneath the receiving part to face directly opposite the receiving port without any obstacles arranged therebetween.

As described above, the lower end portion of the pipe structure of the preheating part 9 is inserted into the upper end portion of the transfer part 11. In the following, the portion of the preheating part 9 that is inserted into the transfer part 11 may be referred to as "inserted pipe part" or "introduction pipe". The inserted pipe part of the preheating part 9 acts as a partition member that divides the internal space of the upper part of the transfer part 11 receiving the inserted pipe part into an interior side of the inserted pipe part and an exterior side of the inserted pipe part (i.e., the tubular space described above). The interior side of the inserted pipe part corresponds to a first transfer part 11A and the exterior side of the inserted pipe part (tubular space) corresponds to a second transfer part 11B.

The first reactor 10A includes the first transfer part 11A, the second transfer part 11B, a third transfer part 11C, the valve part 13, and the solid storage part 14.

The mixed fluid M introduced into the first transfer part 11A of the reactor 10A is transferred within the first transfer part 11A in a vertical direction from the upper side to the lower side. Then, the mixed fluid M enters the third transfer part 11C, which is disposed directly below the first transfer part 11A and the second transfer part 11B, and communicates with the first transfer part 11A and the second transfer part 11B. Even though the mixed fluid M that has entered the third transfer part 11C may continue to move toward the lower side, a discharge port for discharging the mixed fluid M within the first reactor 10A to the exterior is not arranged at a position below the third transfer part 11C. Such a discharge port for discharging the mixed fluid M outside the first reactor 10A (discharge port 11a described below) is arranged at an upper end portion of the second transfer part 11B. Thus, in the first reactor 10A, the mixed fluid M that has entered the third transfer part 11C from the first transfer part 11A abruptly changes its course to flow in the vertical direction from the lower side to the upper side. That is, the mixed fluid M within the third transfer part 11C enters the second transfer part 11B, which communicates with the third transfer part 11C and is located above the third transfer part 11C. The mixed fluid M that has entered the second transfer part 11B then moves within the second transfer part 11B in the vertical direction from the lower side to the upper side. In this way, the mixed fluid M is discharged outside the first reactor 10A via the discharge port 11a that is arranged at the upper end portion of the second transfer part 11B.

In the first reactor 11A, the inserted pipe part acts as a partition member that divides the upper part of the transfer part 11 into the first transfer part 11A and the second transfer part 11B. Further, the valve part 13 that is arranged below the third transfer part 11C communicates with the third transfer part 11C, and the solid storage part 14 that is arranged below the valve part 13 communicates with the valve part 13.

The water contained in the mixed fluid M that has entered the first transfer part 11A from the preheating part 9 is converted into supercritical water or high-temperature and high-pressure vapor near the lower end portion of the first transfer part 11A. Then, the inorganic solids S that have been precipitated from the mixed fluid M near the lower end portion of the first transfer part 11A settle by gravity in the direction indicated by the dotted arrows shown in FIG. 2 to pass through the third transfer part 11C and the interior of the valve part 13 to accumulate at the bottom face 14a of the solid storage part 14. An opening with a diameter that is substantially the same as the inner diameter of the transfer part 11 is formed at the upper end portion of the solid storage part 14, and this opening of the solid storage part 14 acts as a communication port for communicating with the transfer part 11 via the valve part 13. The inorganic solids S precipitated from the mixed fluid M at the first transfer part 11A is received into the solid storage part 14 via this communication port.

On the other hand, the mixed fluid M that has been converted from the liquid state into the supercritical state or the high-temperature and high-pressure vapor state near the lower end portion of the first transfer part 11A substantially increases in volume as a result of such a phase change. However, because no outlet is arranged at the solid storage part 14 as described above, the mixed fluid M cannot move in the direction of gravitational force toward the solid storage part 14. Thus, the mixed fluid M moves in the direction toward the second transfer part 11B, which includes the discharge port 11a. Specifically, water contained in the mixed fluid M is converted into supercritical water or high-temperature and high-pressure vapor near the lower end portion of the first transfer part 11A, which is located below the discharge outlet 11a. While increasing in volume, the mixed fluid M moves through the first transfer part 11A in the vertical direction from the upper side to the lower side to enter the third transfer part 11C after which it reverses its direction of movement. That is, after entering the third transfer part 11C, the mixed fluid M reverses its course and starts moving in the vertical direction from the lower side to the upper side toward the discharge port 11a. In this way, the mixed fluid M enters the second transfer part 11B from the third transfer part 11C and continues moving from the lower side to the upper side in the vertical direction within the second transfer part 11B. Then, the mixed fluid M passes through the discharge port 11a to enter a communication pipe 100.

The inorganic solids accumulated on the bottom face 14a of the solid storage part 14 may confine the discharge port 11a and obstruct the flow of the mixed fluid M flowing from the second transfer part 11B to the second reactor 10B. However, by arranging the discharge port 11a at a position above the solid storage part 14 with respect to the vertical direction, the inorganic solids S may be prevented from confining the discharge port 11a until the inorganic solids S accumulated on the bottom face 14a of the solid storage part 14 reaches the height of the discharge port 11a. In this way, the solid storage part 14, which is located below the transfer part 11 within the first reactor 10A, functions as a temporary storage part for temporarily storing the inorganic solids S accumulated on the bottom face 14a to prevent the inorganic solids S from confining the discharge port 11a. By arranging the solid storage part 14 to have a sufficiently large capacity, the frequency of performing cleaning operations on the reactor 10 may be reduced even when suspended solids contained in the liquid waste W are note removed before introducing the liquid waste W into the reactor 10. Further, by introducing into the reactor 10 the liquid waste W that has not undergone a removal process for removing suspended solids including organic suspended solids, the decomposition energy of the organic suspended solids may be used to maintain a high temperature within the reactor 10.

The mixed fluid M that has entered the communication pipe 100 from the transfer part 11 of the first reactor 10A passes through the communication pipe 10C to enter the second reactor 10B illustrated in FIG. 1. The second reactor 10B and the cooling part 30 are each arranged into pipe structures that extend in the vertical direction. The diameters of the second reactor 10B and the cooling part 30 are arranged to be substantially the same, and the second reactor 10B and the cooling part 30, which is arranged above the second reactor 10B, communicate with each other. The mixed liquid M that has entered the lower end portion of the second reactor 10B from the communication pipe 100 moves in the vertical direction from the lower side to the upper side within the second reactor 10B.

Within the transfer part 11, the communication pipe 100, and the second reactor 10B, oxidative decomposition of organic matter contained in the mixed fluid M may occur under the presence of oxygen and/or decomposition of ammonia nitrogen into nitrogen may occur, for example. Conditions may be particularly favorable for inducing oxidative decomposition of organic matter within the second reactor 10B because a catalyst for accelerating oxidative decomposition of organic matter is included within the second reactor 10B. The catalyst may be a chemical compound containing at least one of Ru, Pd, Rh, Pt, Au, Ir, Os, Fe, Cu, Zn, Ni, Co, Ce, Ti, and Mn.

The mixed liquid M that has had organic matter almost completely decomposed by oxidative decomposition within the second reactor 10B moves from the second reactor 10B to the cooling part 30. Then, the mixed liquid M is cooled at the cooling part 30 by the heat exchanger 31. In the case of cooling the mixed liquid M within the cooling part 30 at a relatively high cooling rate, the following measures may be implemented to prevent the cooled mixed liquid M from flowing back towards the second reactor 10B. In one example, the cooling part 30 may be arranged below the second reactor 10B, and the mixed fluid M may be transferred vertically from the upper side to the lower side to pass through the second reactor 10B and then the cooling part 30. In another example, the second reactor 10B and the cooling part 30 may be connected to each other via a tube with a small diameter to prevent back-flow of the mixed fluid. In yet another example, the second reactor 10B and the cooling part 30 may be connected to each other in the horizontal direction.

The inner diameter of the solid storage part 14 is arranged to be greater than or equal to the inner diameter of the transfer part 14. That is when the inner diameter of the solid storage part 14 is arranged to be smaller than the inner diameter of the transfer part 11, lumps of the inorganic solids S may clog the opening formed at the upper end portion of the solid storage part 14.

The solid storage part 14 includes an accumulation level detection unit for detecting the accumulation level (height) of the inorganic solids S accumulated on the bottom face 14a. In the fluid purifying apparatus according to the present embodiment, a conventional capacitance level sensor is used as the accumulation level detection unit. The programmable sequencer may be configured to turn on an alarm lamp to prompt an operator to conduct cleaning operations when the accumulation level data transmitted from the accumulation level detection unit reached a predetermined upper limit, for example.

In a case where the concentration of inorganic suspended solids contained in the liquid waste W is relatively stable over time, an average time period for the accumulated inorganic solids S to reach the accumulation level upper limit may be calculated beforehand based on the average concentration of the inorganic suspended solids. In this case, in addition to controlling the alarm lamp to turn on based on the detection result of the accumulation level detection unit, the programmable sequencer is preferably configured to control the alarm lamp to turn on based on a threshold time period corresponding to the average time period plus a certain amount of delay time. In this way, even when the accumulation level detection unit fails to accurately detect the accumulation level of the inorganic solids S due to some error or malfunction, the alarm lamp may be turned on at the appropriate timing, for example.

In one modified embodiment of the present embodiment, the valve part 13 of the first reactor 10A may be omitted and the transfer part 11 at the upper side of the first reactor 10A may be directly connected to the solid storage part 14 at the lower side of the first reactor 10A. However, maintainability may be improved by arranging the valve part 13 between the transfer part 11 and the solid storage part 14.

Figure 3:
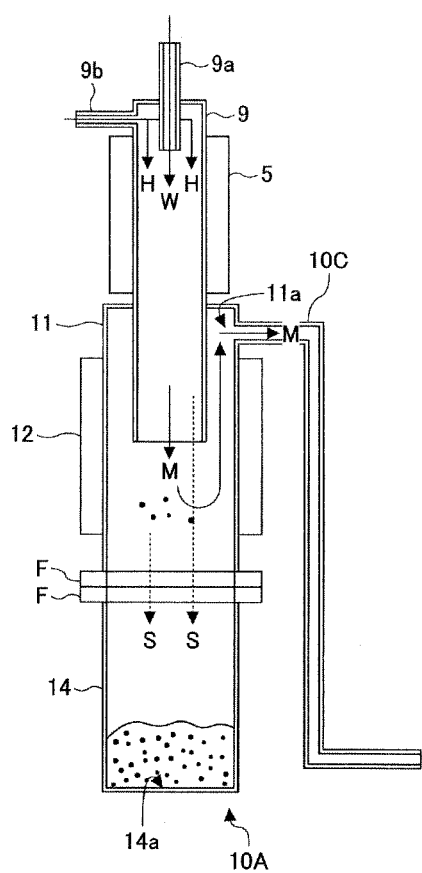
FIG. 3 is a vertical cross-sectional view of the first reactor and the preheating part of the fluid purifying apparatus according to a modified embodiment of the first embodiment.

FIG. 3 is a vertical cross-sectional view of the preheating part 9 and the first reactor 11A according to the modified embodiment in which the transfer part 11 is directly connected to the solid storage part 14. In FIG. 3, the transfer part 11 and the solid storage part 14 are connected to each other by two flanges F. By pulling out a bolt (not shown) that is clamped into the two flanges F, the solid storage part 14 including one of the flanges F may be detached from the transfer part 11 including the other one of the flanges F. Then, after removing the inorganic solids S from the detached solid storage part 14, the solid storage part 14 may be attached to the transfer part 11 once more to complete cleaning operations. Although these procedures themselves may be performed with relative ease, the process of reducing the pressure within the reactor 10 may be rather burdensome. That is, because the pressure within the reactor 10 is raised to a high pressure during operation, the solid storage part 14 may not be detached from the transfer part 11 in this state. To detach the solid storage part 14, first, operation of the fluid purifying apparatus has to be stopped, and the mixed fluid M within the reactor 10 and the cooing part 30 have to be gradually discharged so that the pressure within the reactor 10 may be decreased to atmospheric pressure. That is, to perform the cleaning operations for removing the inorganic solids S from the reactor 10, operation of the fluid purifying apparatus has to be stopped and this may degrade the maintainability of the fluid purifying apparatus.

On the other hand, in the case where the reactor 10 as illustrated in FIG. 2 is used in the fluid purifying apparatus, operation of the apparatus does not have to be stopped when cleaning operations are performed. Specifically, as illustrated in FIG. 2, in the reactor 10 of the present embodiment, an open pipe 14b is arranged near the upper end of the solid storage part 14, and the storage part open valve 16 is connected to this open pipe 14b. The storage part open valve 16 is normally closed. However, when performing cleaning operations, first, a valve of the valve part 13 is manually closed so that the transfer part 11 and the solid storage part 14 may be isolated from each other to form independent spaces. Then, the storage part open valve 16 may be opened to discharge the mixed fluid M accommodated in the solid storage part 14 so that the pressure within the solid storage part 14 may be decreased to atmospheric pressure. At this time, the solid storage part 14 forms a space that is completely independent from the transfer part 11. Thus, even when the pressure within the solid storage part 14 is reduced, the pressure with the transfer part 11 may be maintained at a high pressure (i.e., the pressure within the transfer part 11 may remain unchanged). Then, a bolt inserted through a flange of the valve part 13 and a flange of the solid storage part 14 is removed so that the solid storage part 14 may be detached from the valve part 13.

Figure 4:
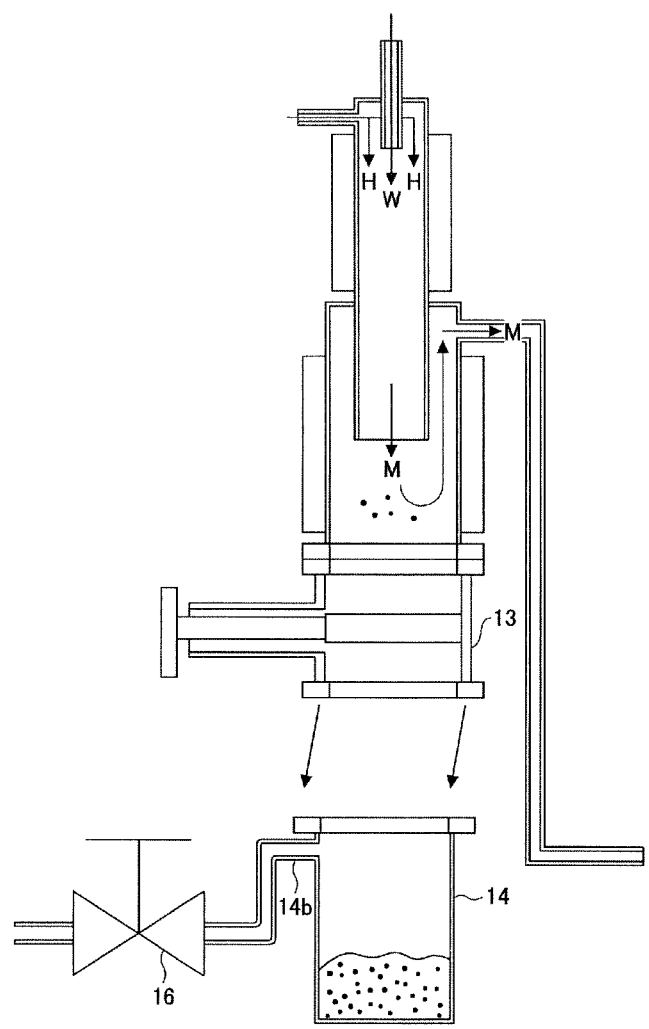
FIG. 4 is a vertical cross-sectional view of the first reaction part having a solid storage part detached from a valve part.

FIG. 4 illustrates the first reactor 10A with the solid storage part 14 detached from the valve part 13. While the solid storage part 14 is detached from the valve part 13, the inorganic solids S generated within the transfer part 11 accumulate at the valve of the valve part 13. After removing the inorganic solids S from the solid storage part 14, the operator fixes the solid storage part 14 to the valve part 13 and connects the booster pump 17 (see FIG. 1) to the storage part open valve 16. The booster pump 17 is used to send air into the solid storage part 14 so that the pressure within the solid storage part 14 may be raised to be equal to the pressure within the transfer part 11. Then, after closing the storage part open valve 16, the valve of the valve part 13 is opened. In this way, the transfer part 11 may be reconnected to the solid storage part 14 via the valve part 13, and the inorganic solids S accumulated at the valve of the valve part 13 may settle and accumulate at the solid storage part 14. With such a configuration, cleaning operations may be performed without stopping operation of the fluid purifying apparatus.

Figure 5:
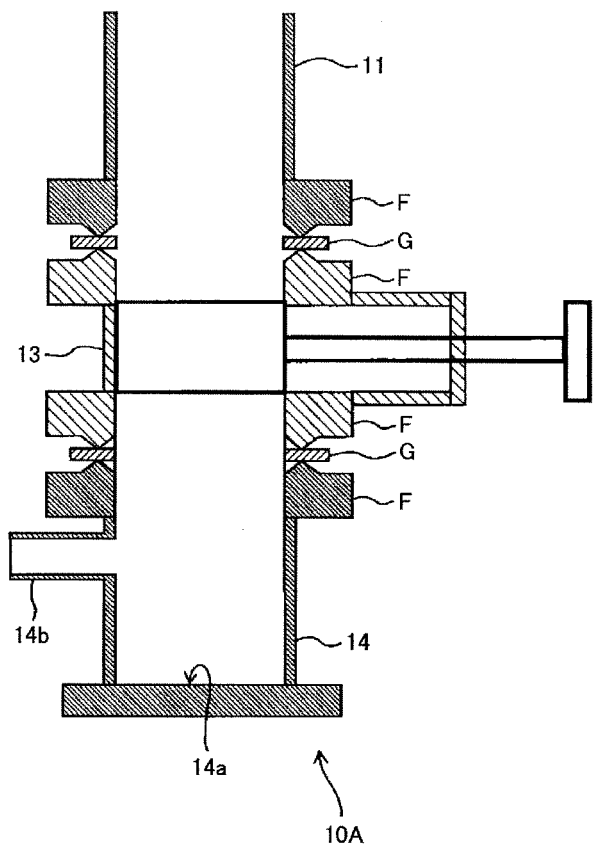
FIG. 5 is a vertical cross-sectional view of the first reactor having gaskets arranged between a transfer part and the valve part and between the valve part and the solid storage part.

FIG. 5 is a vertical cross-sectional view of the first reactor 10A of the fluid purifying apparatus according to a preferred embodiment. In FIG. 5, a gasket G for improving airtightness is arranged between a flange F of the transfer part 11 and an upper flange F of the valve part 13. Also, a gasket G for improving airtightness is arranged between a lower flange F of the valve part 13 and a flange F of the solid storage part 14. Metal gaskets that have high resistance to heat are used as the gaskets G. Thus, the gaskets G may improve airtightness of the reactor 10A for a relatively long period of time even though the first reactor 10A is operated at a high temperature.

In another preferred embodiment, a removable tube coupling may be used to connect the valve part 13 and the solid storage part 14. Such a tube coupling preferably includes a coupling body and a ferrule made of metal that has high resistance to heat.

In the following, a fluid purifying apparatus according to a second embodiment is described. Note that unless otherwise specified, the configuration of the fluid purifying apparatus of the second embodiment may be substantially identical to that of the above-described first embodiment and the same reference numerals are used to identify corresponding components.

The reactor 10 of the fluid purifying apparatus according to the second embodiment includes only the first reactor 10A but not the second reactor 10B of the first embodiment. That is, the fluid purifying apparatus according to the second embodiment has only has one reactor. Although referring to this reactor as "first reactor 10A" may not be appropriate under normal circumstances, such term is used for the purpose of facilitating comparison with the previously described first embodiment.

Figure 6:
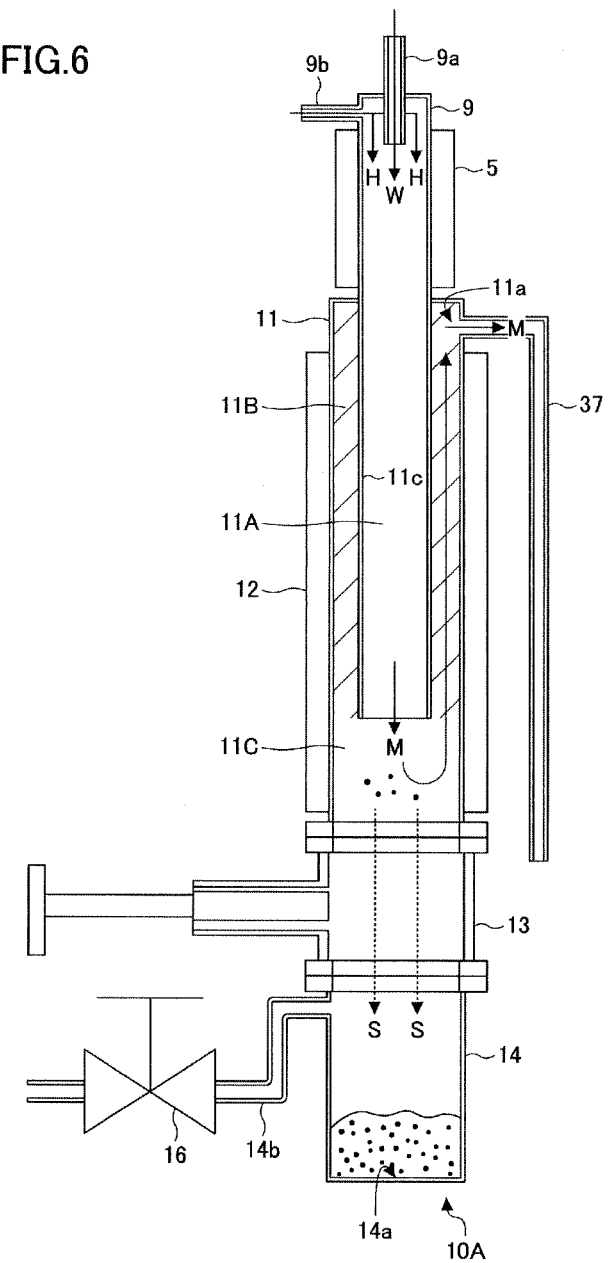
FIG. 6 is vertical cross-sectional view the first reactor and the preheating part of the fluid purifying apparatus according to a second embodiment of the present invention.

FIG. 6 is a vertical cross-sectional view of the preheating part 9 and the reactor 10 of the fluid purifying apparatus according to the second embodiment. As in the previously described embodiment, the upper part of the pipe structure of the preheating part 9 has the preheating device 5 fixed to its outer wall and is configured to preheat an oxidant or liquid waste that enters the preheating part 9. Below this upper part of the preheating part 9 is the inserted pipe part that is inserted into the transfer part 11 of the reactor 10. The inserted pipe part acts as an introduction pipe 11c for introducing liquid waste W into the transfer part 11.

The transfer part 11 has an opening formed at its upper wall, and the introduction pipe 11c is inserted into the transfer part 11 via this opening. The opening of the transfer part 11 acts as a receiving port for receiving the liquid waste W that is introduced into the transfer part 11. The interior of the introduction pipe 11c corresponds to the first transfer part 11A. Also, the tubular space formed by the outer well of the introduction pipe 11c and the inner wall of the transfer part 11 corresponds to the second transfer part 11B. In FIG. 6, the second transfer part 11B is indicated by hatched lines.

The upper end portion of second transfer part 11B is connected to the discharge pipe 37 for discharging purified fluid from the second transfer part 11B. The portion connecting the transfer part 11 and the discharge pipe 37 corresponds to the discharge port 11a for discharging the purified fluid outside the reactor 10. The discharge port 11a is located at a position above the lower end of the introduction pipe 11c.

At the first transfer part 11A located inside the introduction pipe 11c, the mixed fluid M from the preheating part 9 moves in the vertical direction from the upper side to the lower side. While the mixed fluid M is transferred within the first transfer part 11A in this manner, the first heater 12 heats the mixed fluid M within the first transfer part 11A via the wall of the transfer part 11, the mixed fluid M within the second transfer part 11B, and the wall of the introduction pipe 11c. Also, in the fluid purifying apparatus of the present embodiment, heat generated from oxidization of organic matter contained in the mixed fluid M within the second transfer part 11B is used to heat the mixed fluid M accommodated within the first transfer part 11A. That is, the oxidization heat generated within the second transfer part 11B is transmitted to the mixed fluid M within the first transfer part 11A via the wall of the introduction pipe 11c to thereby heat the mixed fluid M within the first transfer part 11A.

The mixed fluid M heated within the first transfer part 11A increases in volume by having water contained therein converted from liquid to supercritical water or high-temperature and high-pressure vapor, and has inorganic suspended solids precipitated as inorganic solids S from the water. The precipitated inorganic solids S enter the third transfer part 11C from the lower end of the introduction pipe 11c along with the mixed fluid M that is converted into supercritical water or high-temperature and high-pressure vapor. Then, because no outlet is arranged at the solid storage part 14, the moving direction of the mixed fluid M is reversed. Accordingly, the mixed liquid M that enters the third transfer part 11C via a ring-shaped opening surrounding the lower end of the introduction pipe 11c changes its course and moves from the third transfer part 11C toward the second transfer part 11B. As in the previously described embodiment, the second transfer part 11B of the present embodiment includes a catalyst for accelerating oxidative decomposition of organic matter. Thus, when the mixed fluid enters the second transfer part 11B, oxidative decomposition of organic matter contained in the mixed fluid M is accelerated by the catalyst within the second transfer part 11B. While undergoing such oxidative decomposition, the mixed fluid M that has entered the second transfer part 11B moves in the vertical direction from the lower side to the upper side. Then the mixed fluid M is discharged from the second transfer part 11B via the discharge port 11a to enter the discharge pipe 37.

According to an aspect of the present embodiment, the reactor 10 has a simple structure extending in a straight line in the vertical direction so that greater layout design flexibility may be allowed in the fluid purifying apparatus, for example. Also, in the transfer part 11, after the mixed fluid M is moved via the introduction pipe 11c in the vertical direction from the upper side to the lower side toward the solid storage part 14, the moving direction of the mixed fluid M is abruptly changed near the solid storage part 14 so that the inorganic solids S may be separated from the mixed fluid M.

In the following, a fluid purifying apparatus according to a third embodiment is described. Note that unless otherwise specified, the configuration of the fluid purifying apparatus of the third embodiment may be substantially identical to those of the previously described embodiments, and the same reference numerals are used to identify corresponding components.

Figure 7:
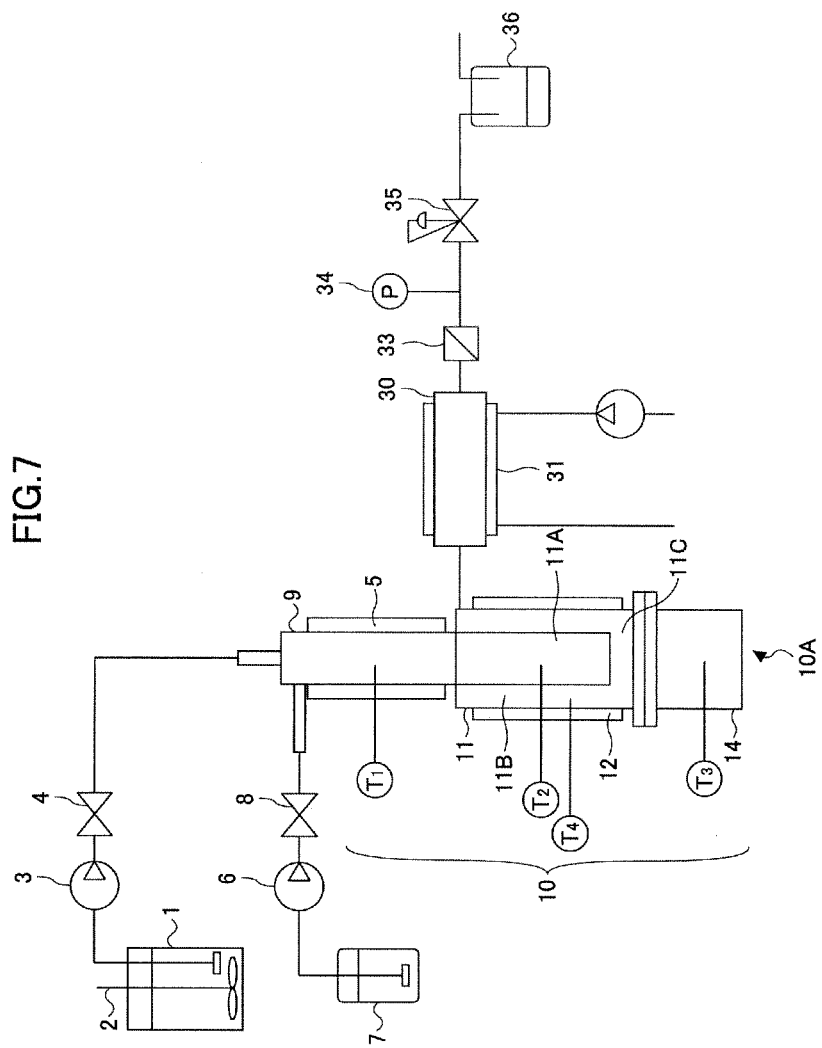
FIG. 7 is a schematic view of an overall configuration of the fluid purifying apparatus according to a third embodiment of the present invention.
Figure 8:
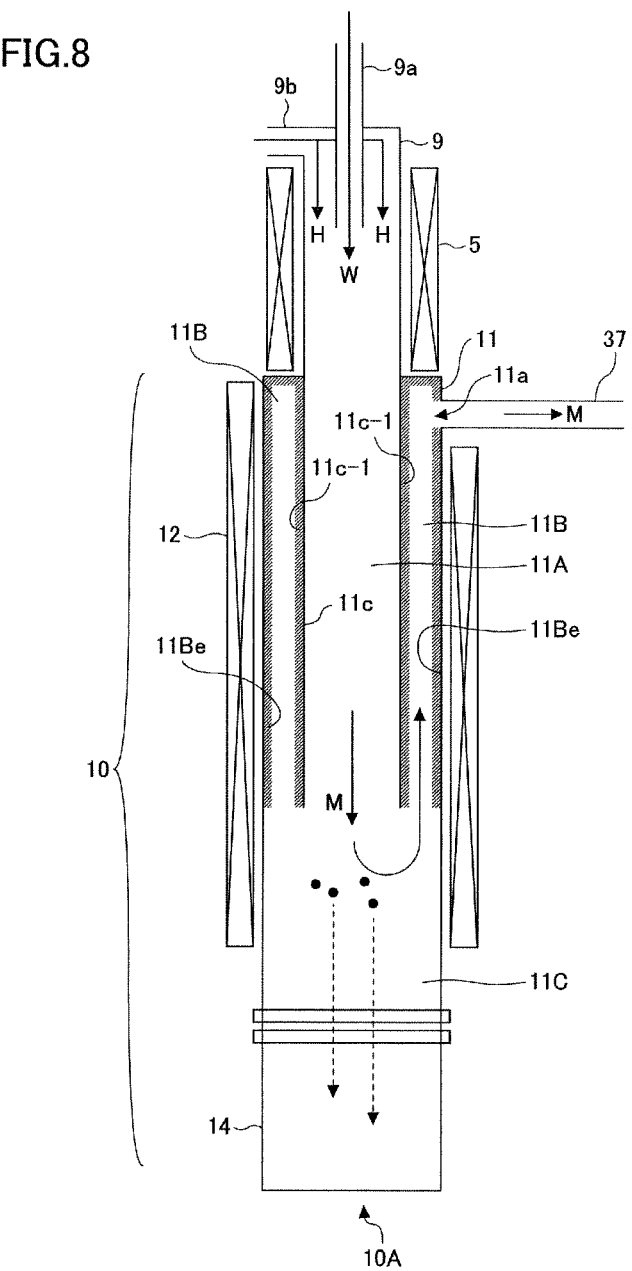
FIG. 8 is a vertical cross-sectional view of the first reactor of the fluid purifying apparatus according to the third embodiment.

FIG. 7 is a schematic view of an overall configuration of the fluid purifying apparatus according to the third embodiment. As in the second embodiment, the reactor 10 of the fluid purifying apparatus according the third embodiment only includes the first reactor 10A. FIG. 8 is a vertical cross-sectional view of the reactor 10A of the fluid purifying apparatus according to the third embodiment. As illustrated in FIG. 8, the reactor 10A of the present embodiment does not include a valve part, and the solid storage part 14 is connected to the third transfer part 11C via a coupling.

In the first reactor 10A of the present embodiment, the outer wall of the introduction pipe 11c is covered by a catalyst layer 11c-1, which is made of a catalytic material that induces oxidative decomposition of organic matter. Also, the inner wall portion of the pipe structure of the transfer part 11 that faces the introduction pipe 11c is covered by a catalyst layer 11Be, which is also made of the catalytic material. In the present embodiment, the catalyst layers 11c-1 and 11Be include Pb as the catalytic material.

With such a configuration, the mixed fluid M that has entered the second transfer part 11B from the third transfer part 11C comes into contact with the catalyst layers 11c-1 and 11Be and oxidative decomposition of the organic matter contained in the mixed fluid M is induced as a result. While undergoing such oxidative decomposition, the mixed fluid M moves towards the discharge port 11a. According to an aspect of the present embodiment, organic matter contained in the mixed fluid M may be efficiently decomposed by such catalyst action so that a second reactor may not have to be used to induce further oxidative decomposition of organic matter. Also, as described above, by inducing oxidative decomposition of organic matter within the second transfer part 11B, heat may be generated from the oxidative decomposition, and the generated heat may be used to heat the mixed fluid M accommodated within the first transfer part 11A. Also, by using the catalyst layers 11c-1 and 11Be as the catalyst, oxidative decomposition of organic matter may be efficiently induced with a relatively small amount of catalytic material. Further, by arranging the catalyst layers 11c-1 and 11Be along the outer periphery of the introduction pipe 11c and the inner periphery of the pipe structure of the transfer part 11, respectively, and using the catalyst layers 11c-1 and 11Be as the catalyst, greater flexibility may be allowed in designing the shape of the reactor 10, for example.

In the following, exemplary modified embodiments of the fluid purifying apparatus according to the third embodiment are described. Note that unless otherwise specified, configurations of the fluid purifying apparatus of the following modified embodiments may be substantially identical to that of the third embodiment.

First Modified Embodiment

Figure 9:
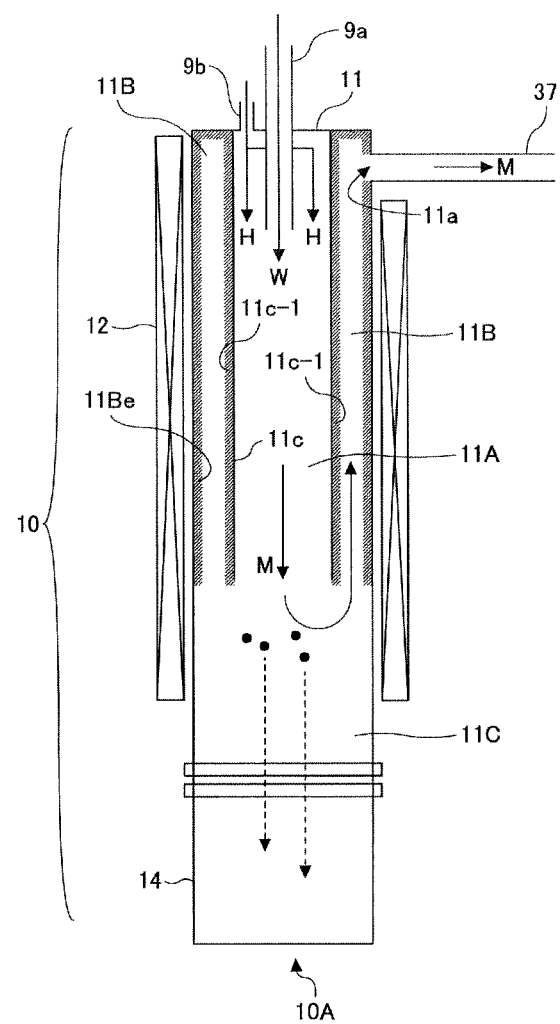
FIG. 9 is a vertical cross-sectional view of the first reactor of the fluid purifying apparatus according to a first modified embodiment of the third embodiment.

FIG. 9 is a vertical cross-sectional view of the reactor 10 according to a first modified embodiment. In FIG. 9, the introduction pipe 11c of the first reactor 10A is a separate element from the preheating part 9. Further, the liquid waste receiving part 9a and the oxidant receiving part 9b are directly connected to the first transfer part 11A of the first reactor 10A. In the present embodiment, the liquid waste W and the oxidant H are introduced into the first transfer part 11A via the liquid waste receiving part 9a and the oxidant receiving part 9b, respectively, and are mixed with each other inside the first transfer part 11A to become the mixed fluid M. That is, the liquid waste W and the oxidant H are mixed with each other after being introduced into the first reactor 10A.

Although the preheating device of the preheating part is not illustrated in FIG. 9, the preheating device may be arranged at one or both of the liquid waste receiving part 9a and the oxidant receiving part 9b. Alternatively, the heating device may be omitted in a case where the liquid waste W to be treated has a relatively high concentration of organic matter such that the mixed fluid M may be adequately heated to a desired temperature by the heat generated from oxidative decomposition of the organic matter.

Also, in the present embodiment, the introduction pipe 11c that acts as a partition member is made of Ti, which is a corrosion-resistant material. Further, as in the previously described embodiment, the catalyst layer 11c-1 is arranged on the outer periphery of the introduction pipe 11c, and the catalyst layer 11Be is arranged on the inner periphery of the pipe structure of the transfer part 11.

Second Modified Embodiment

The fluid purifying apparatus according to a second modified embodiment is a variation of the above-described first modified embodiment and has a configuration similar to that of the first modified embodiment other than the features described below.

Figure 10:
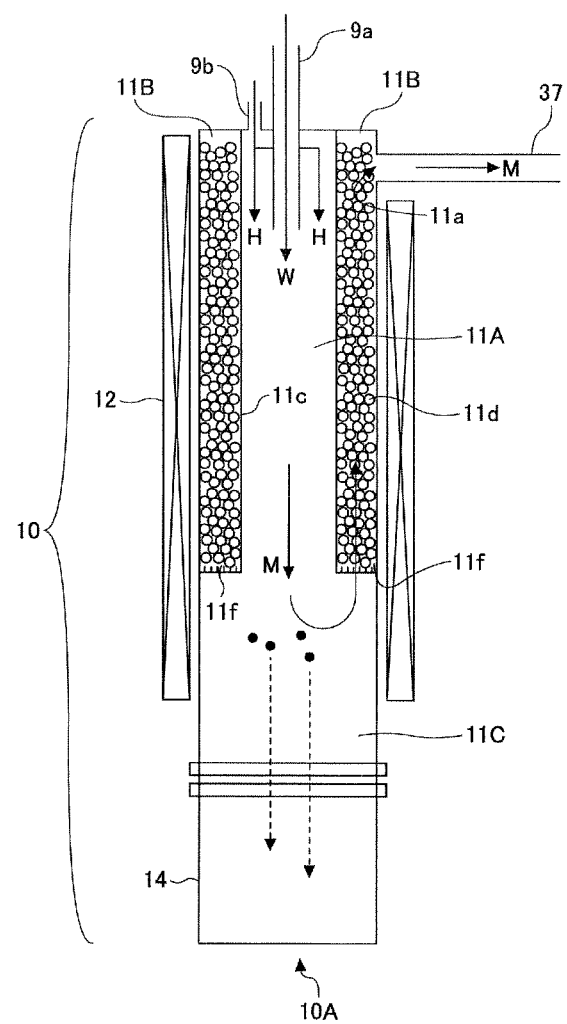
FIG. 10 a vertical cross-sectional view of the first reactor of the fluid purifying apparatus according to a second modified embodiment of the third embodiment.

FIG. 10 is a vertical cross-sectional view of the reactor 10 of the fluid purifying apparatus according to the second modified embodiment. In FIG. 10, the first reactor 10A does not include the catalyst layers 11c-1 and 11Be. Instead, the first reactor 10A includes a plurality of catalyst particles 11d and a catalyst holding mesh 11f.

The catalyst holding mesh 11f is arranged into a ring shape corresponding to the cross-sectional shape of the space between the introduction pipe 11c and the pipe structure of the transfer part 11. The catalyst holding mesh 11f is arranged to have a plurality of mesh holes and is fixed to a bottom end portion of the second transfer part 11B. In this way, the mixed fluid M within the third transfer part 11C may easily pass through the catalyst holding mesh 11f to enter the second transfer part 11B.

The second transfer part 11B is filled with a plurality of the catalyst particles 11d that are held by the catalyst holding mesh 11f. In this way, the catalyst particles 11b may be retained within the second transfer part 11B while the mixed fluid M is transferred from the third transfer part 11C to the second transfer part 11B.

The catalyst holding mesh 11f may be a Ti metal mesh that is created by weaving together thin wires made of Ti, which is a corrosion-resistant material, for example. The catalyst particles 11d may be created by coating a catalyst layer made of a catalytic material on the surface of a particle base material, for example. Alternatively, the catalyst particles 11d may be made entirely of a catalytic material. For example, particles of $MnO_2$ may be used as the catalyst particles 11d. The mixed fluid M that has entered the second transfer part 11B passes through small gaps formed between the catalyst particles 11d and move toward the discharge port 11a.

According to an aspect of the present embodiment, by using the catalyst particles 11d as the catalyst instead of catalyst layers, the mixed fluid M may come into contact with the catalyst with increased frequency within the second transfer part 11B (i.e., total area of contact with the catalyst upon passing through the second transfer part 11B may be increased) compared to the first modified embodiment so that oxidative decomposition of organic matter may be induced more efficiently.

Third Modified Embodiment

The fluid purifying apparatus according to a third modified embodiment is a variation of the above-described second modified embodiment and has a configuration similar to that of the second modified embodiment other than the features described below.

Figure 11:
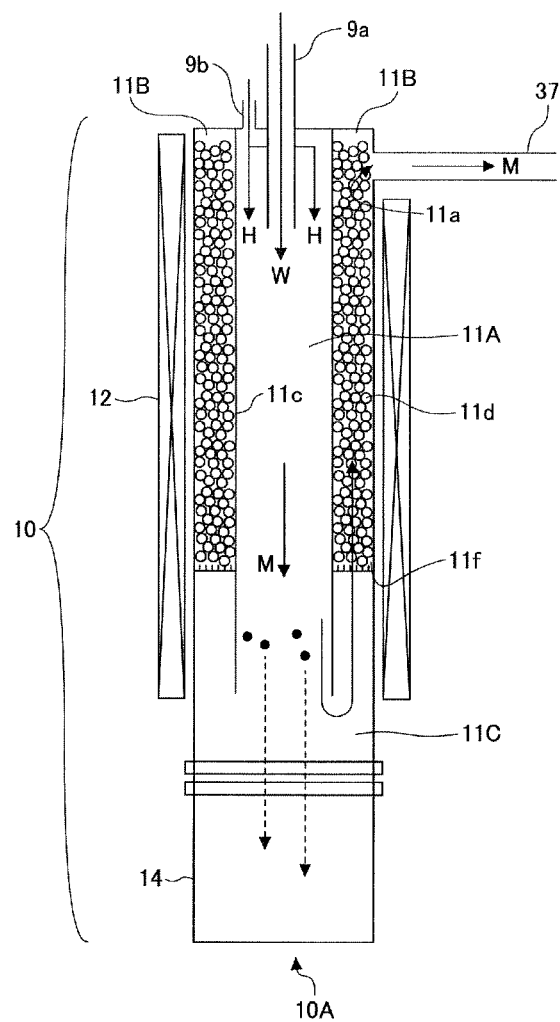
FIG. 11 is a vertical cross-sectional view of the first reactor of the fluid purifying apparatus according to a third modified embodiment of the third embodiment.

FIG. 11 is a vertical cross-sectional view of the reactor 10 of the fluid purifying apparatus according to the third modified embodiment. In FIG. 11, the length of the introduction pipe 11c is arranged to be longer than that of the second modified embodiment. As a result, the volume of the second transfer part 11B is increased while the volume of the third transfer part 11C is decreased. Note, however, that the position of the catalyst holding mesh 11f (in to the pipe length direction) is arranged to be the same as the second modified embodiment. In this way, the distance from the position at which the mixed fluid M enters the second transfer part 11B to the position at which the mixed fluid M comes into contact with the catalyst holding mesh 11f (referred to as "pre-mesh distance") may be increased compared to the second modified embodiment.

As described above, the mixed fluid M that has moved through the first transfer part 11A in the vertical direction from the upper side to the lower side and has entered the third transfer part 11C abruptly changes its moving direction to enter the second transfer part 11B. At such time, most solids contained in the mixed fluid M are separated from the mixed fluid M and settle by gravity towards the solid storage part 14. However, a small amount of solids may be thrown up by the mixed fluid M and move along with the mixed fluid M for a while in the vertical direction from the lower side to the upper side to enter the second transfer part 11B. When such solids come into contact with the catalyst holding mesh 11f, they may be stuck to the surface of the catalyst holding mesh 11f and clog the mesh holes.

In the present embodiment, the pre-mesh distance is increased so that the small amount of solids that have entered the second transfer part 11B along with the mixed fluid M may settle while the mixed fluid M moves along the pre-mesh distance. In this way, clogging of the catalyst holding mesh 11f may be prevented.

Fourth Modified Embodiment

The fluid purifying apparatus according to a fourth modified embodiment is a variation of the above-described second modified embodiment and has a configuration similar to that of the second modified embodiment other than the features described below.

Figure 12:
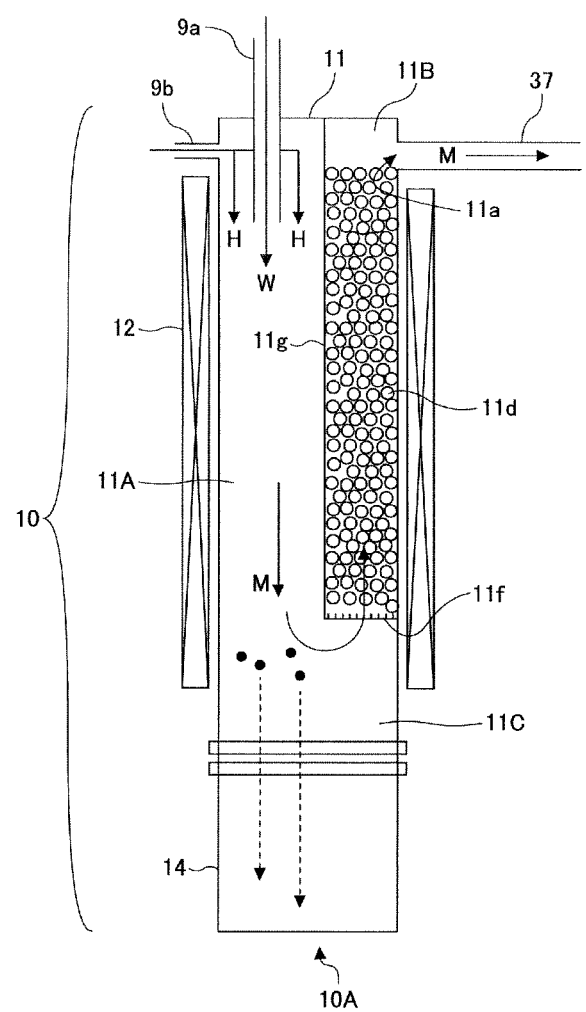
FIG. 12 is a vertical cross-sectional view of the first reactor of the fluid purifying apparatus according to a fourth modified embodiment of the third embodiment.

FIG. 12 is a vertical cross-sectional view of the reactor 10 of the fluid purifying apparatus according to the fourth modified embodiment. In FIG. 12, the first reactor 10A does not have an introduction pipe. Instead, the first reactor 10A of the present embodiment includes a partition plate 11g. The partition plate 11g is fixed to a top part of the pipe structure of the transfer part 11 and extends in the lengthwise direction of the pipe structure to divide an upper portion of the transfer part 11 into two separate spaces. That is, the partition plate 11g divides the upper portion of the transfer part 11 into the first transfer part 11A and the second transfer part 11B.

With such a configuration, the structure of the first reactor 10A may be simplified compared to the second modified embodiment while still enabling separation and storage of solids contained in the mixed fluid M in the solid storage part 14.

Fifth Modified Embodiment

The fluid purifying apparatus according to a fifth modified embodiment is a variation of the above-described second modified embodiment and has a configuration similar to that of the second modified embodiment other than the features described below.

Figure 13:
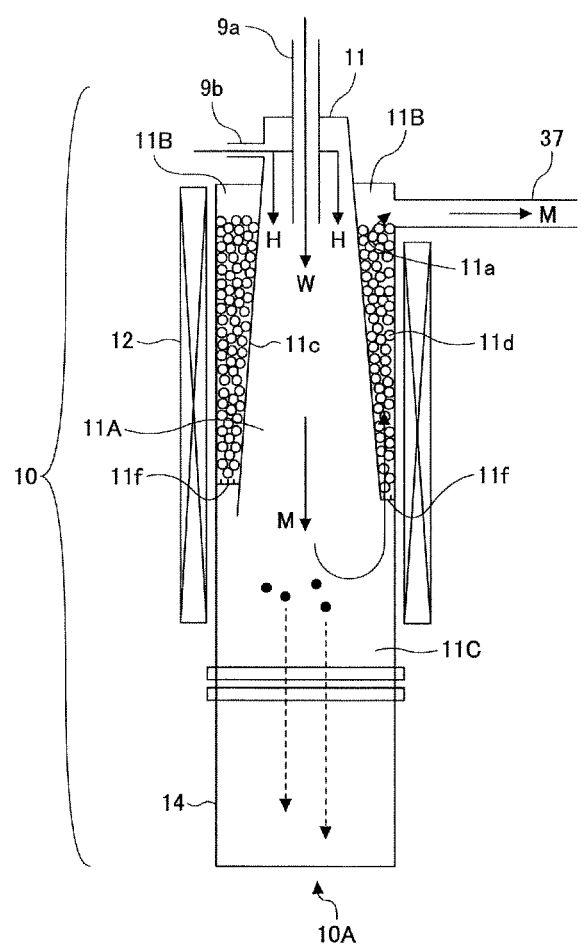
FIG. 13 is a vertical cross-sectional view of the first reactor of the fluid purifying apparatus according to a fifth modified embodiment of the third embodiment.

FIG. 13 is a vertical cross-sectional view of the reactor 10 of the fluid purifying apparatus according to the fifth modified embodiment. In FIG. 13, the introduction pipe 11c of the first reactor 10A is arranged into a sliced-cone shape rather than a cylindrical shape. That is, the internal space of the first transfer part 11A is arranged into a sliced-cone shape with its cross-sectional area becoming progressively larger from the upstream side toward the downstream side of the fluid transferring direction.

The inner periphery of the introduction pipe 11c is reverse-tapered with respect to the moving direction of the mixed fluid M within the first transfer part 11A. With such a configuration, the contact load of solids contained in the mixed fluid M with the introduction pipe 11c may be reduced compared to the second modified embodiment so that the solids may be less likely to be deposited on the inner wall of the introduction pipe. In this way, the solids may be prevented from adhering to the inner wall of the introduction pipe 11c.

Sixth Modified Embodiment

The fluid purifying apparatus according to a sixth modified embodiment is a variation of the above-described fifth modified embodiment and has a configuration similar to that of the fifth modified embodiment other than the features described below.

Figure 14:
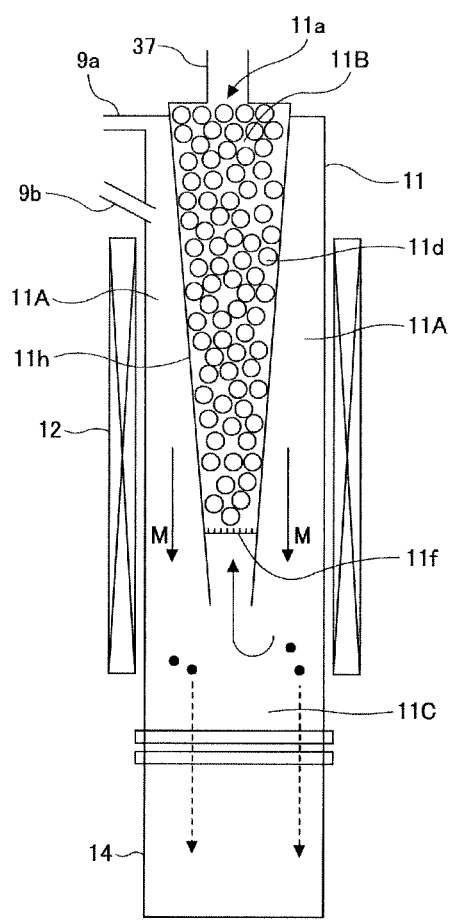
FIG. 14 is a vertical cross-sectional view of the first reactor of the fluid purifying apparatus according to a sixth modified embodiment of the third embodiment.

FIG. 14 is a vertical cross-sectional view of the reactor 10 of the fluid purifying apparatus according to the sixth modified embodiment. In FIG. 14, the first reactor 10A includes a derivation pipe 11h instead of an introduction pipe. The derivation pipe 11h is arranged into a sliced-inverted-cone shape and acts as a partition member that divides the internal space of an upper portion of the transfer part 11 into two separate spaces. Note that the positional relationship between the two spaces in the present embodiment differs from that in the fifth modified embodiment. Specifically, in the present embodiment, the first transfer part 11A corresponds to the space formed between the outer wall of the derivation pipe 11h and the inner wall of the pipe structure of the transfer part 11. The second transfer part 11B corresponds to the internal space of the derivation pipe 11h.

In the first transfer part 11A that is located at the outer side of the derivation pipe 11h, the mixed fluid M moves in the vertical direction from the upper side to the lower side to enter the third transfer part 11C while inducing solid matter (inorganic solids) contained therein to settle at the solid storage part 14. Then, the moving direction of the mixed fluid M is substantially reversed so that the mixed fluid moves in the vertical direction from the lower side to the upper side to enter the second transfer part 11B, which is located at the inner side of the derivation pipe 11h. Then, after passing through the catalyst holding mesh 11f, the mixed fluid M passes through the small gaps formed between the catalyst particles 11d to move toward the discharge port 11a.

The inner periphery of the derivation pipe 11h is reverse-tapered with respect to the moving direction of the mixed fluid M within the second transfer part 11B. With such a configuration, the contact load of solids contained in the mixed fluid M with the derivation pipe 11h may be reduced so that the solids may be less likely to be deposited on the inner wall of the introduction pipe. In this way, the solids may be prevented from adhering to the inner wall of the introduction pipe 11c.

Seventh Modified Embodiment

The fluid purifying apparatus according to a seventh modified embodiment is a variation of the above-described first modified embodiment and has a configuration similar to that of the first modified embodiment other than the features described below.

Figure 15:
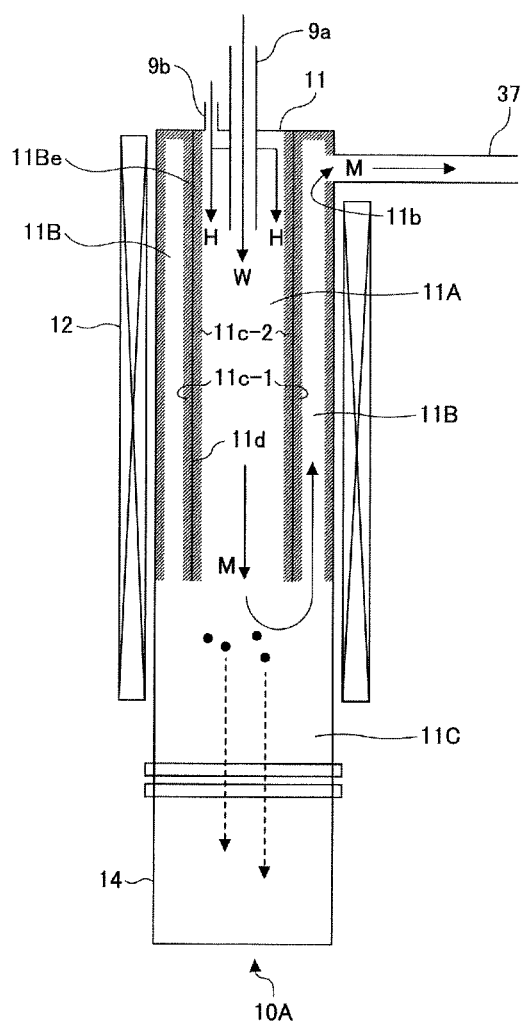
FIG. 15 is a vertical cross-sectional view of the first reactor of the fluid purifying apparatus according to a seventh modified embodiment of the third embodiment.

FIG. 15 is a vertical cross-sectional view of the reactor 10 of the fluid purifying apparatus according to the seventh modified embodiment. In FIG. 15, the first reactor 10A includes a catalyst layer 11c-2 arranged on the inner periphery of the introduction pipe 11c in addition to the catalyst layers 11c-1 and 11Be that are respectively arranged on the outer periphery of the introduction pipe 11c and the inner periphery of the pipe structure of the transfer part 11.

With such a configuration, the mixed fluid M may come into contact with a catalyst within the first transfer part 11A so that oxidative decomposition of organic matter contained in the mixed fluid M accommodated with the first transfer part 11A may be accelerated compared to the first modified embodiment.

Note that the foregoing embodiments are illustrative only and should not be construed to restrict the scope of the present invention as claimed. That is, the present invention is not limited to these embodiments, and numerous variations and modifications may be made without departing from the scope of the present invention.

In the following, various modes of the present invention are described along with their characteristic features and advantageous effects.

(Mode A)

According to Mode A, a fluid purifying apparatus includes a reactor (e.g., reactor 10) that purifies a fluid to be purified that contains organic matter, the reactor being configured to mix an oxidant with the fluid while heating and pressurizing the fluid to induce decomposition of the organic matter. The reactor includes a first transfer part (e.g., first transfer part 11A) that receives the fluid from outside and transfers the fluid in a vertical direction from an upper side to a lower side while heating and pressurizing the fluid and mixing the fluid with the oxidant; a second transfer part (e.g., second transfer part 11B) that receives the fluid that has passed through the first transfer part and transfers the fluid in the vertical direction from the lower side to the upper side; a partition member (e.g., introduction pipe 11c) that partitions at least an upper part of the reactor into the first transfer part and the second transfer part; and a solid storage part (e.g., solid storage part 14) that communicates with the first transfer part and the second transfer part and is arranged below the partition member with respect to the vertical direction, the solid storage part being configured to receive solid matter contained in the fluid that settles while the fluid is transferred through the first transfer part and the second transfer part.

(Mode B)

According to Mode B, in the fluid purifying apparatus of Mode A, a catalyst for accelerating oxidative decomposition of the organic matter is arranged within at least one of the first transfer part and the second transfer part.

(Mode C)

According to Mode C, in the fluid purifying apparatus of Mode A or B, a catalyst for accelerating oxidative decomposition of the organic matter is arranged within the second transfer part. With such a configuration, oxidative decomposition of organic matter contained in the fluid may be more reliably induced within the second transfer part.

(Mode D)

According to Mode D, in the fluid purifying apparatus of any one of Modes A-C, the solid storage part is arranged to be detachable from a main part of the reactor including the first transfer part and the second transfer part. With such a configuration, operation of the fluid purifying apparatus may not have to be stopped when conducting cleaning operations for cleaning the reactor.

(Mode E)

According to Mode E, in the fluid purifying apparatus of any one of Modes A-D, an introduction pipe (e.g., introduction pipe 11c) for introducing the fluid into the first transfer part is arranged to protrude downward in the vertical direction from an upper end wall of the first transfer part; and a discharge port (e.g., discharge port 11a) for discharging the fluid that has been transferred through the second transfer part is arranged at a position above a lower end of the introduction pipe, which is arranged within the first transfer part. With such a configuration, the reactor may be arranged into a simple structure extending in a straight line in the vertical direction so that layout design flexibility may be increased. Further, within the main part (e.g., transfer part 11) of the reactor, after the fluid is moved through the introduction pipe 11c in the vertical direction from the upper side to the lower side toward the solid storage part, the moving direction of the fluid may be abruptly changed near the solid storage part so that solid matter (e.g., inorganic solids) contained in the fluid may be separated from the fluid.

(Mode F)

According to Mode F, in the fluid purifying apparatus of Mode D, the solid storage part is arranged into a pipe structure that extends in the vertical direction and the solid storage part is connected to the main part of the reactor by a coupling. With such a configuration, the solid storage part that has solid matter (e.g., inorganic solids) accumulated therein may be easily detached from the main part of the reactor by manipulating the coupling.

(Mode G)

According to Mode G, in the fluid purifying apparatus of Mode F, the main part of the reactor and the solid storage part are connected via a valve part (e.g., valve part 13). With such a configuration, the lower end part of the reactor (e.g., solid storage part 14) may be easily detached from the main part of the reactor to be cleaned while the fluid purifying apparatus is in operation.

(Mode H)

According to Mode H, the fluid purifying apparatus of Mode G further includes a pressure reducing mechanism (e.g., open pipe 14b and storage part open valve 16) for reducing a pressure within the solid storage part; and a pressure boosting mechanism (e.g., open valve 14b, storage part open valve 16, and booster pump 17) for increasing the pressure within the solid storage part. With such a configuration, after isolating the solid storage part from the main part (e.g., transfer part 11) of the reactor using the valve part, the pressure within the solid storage part may be rapidly increased/decreased so that the duration of the cleaning operations may be reduced.

(Mode I)

According to Mode I, the fluid purifying apparatus of any one of Modes A-H includes an accumulation level detection unit that detects an accumulation level of the solid matter stored within the solid storage part. With such a configuration, the appropriate timing for cleaning the reactor may be determined based on the detection result of the accumulation level detection unit.

(Mode J)

According to Mode J, in the fluid purifying apparatus of Mode G or H, a first metal gasket (e.g., gasket G) is arranged between the main part of the reactor and the valve part, and a second metal gasket (e.g., gasket G) is arranged between the valve part and the solid storage part. With such a configuration, airtightness of the reactor may be maintained for a long period of time by the metal gaskets even though the reactor is operated at a high temperature.

The present application is based on and claims the benefit of priority of Japanese Patent Application No. 2012-180910 filed on Aug. 17, 2012 and Japanese Patent Application No. 2013-121706 filed on Jun. 10, 2013, the entire contents of which are hereby incorporated by reference.

What is claimed is:

1. A fluid purifying apparatus comprising:
a preheating part;
a preheating device fixed to an outer wall of the preheating part and configured to preheat a fluid to be purified;
a reactor that purifies the fluid, wherein the fluid contains organic matter, the reactor being configured to mix an oxidant with the fluid while heating and pressurizing the fluid to induce decomposition of the organic matter;
wherein the reactor comprises a first reactor portion and a second reactor portion, and the first reactor portion includes:
  a first transfer part that receives the fluid from outside and transfers the fluid in a vertical direction from an upper side to a lower side while heating and pressurizing the fluid and mixing the fluid with the oxidant;
  a second transfer part that receives the fluid that has passed through the first transfer part and transfers the fluid in the vertical direction from the lower side to the upper side;
  a partition member that partitions at least an upper part of the first reactor portion into the first transfer part and the second transfer part; and
  a solid storage part that communicates with the first transfer part and the second transfer part and is arranged below the partition member with respect to the vertical direction, the solid storage part being configured to receive solid matter contained in the fluid that settles while the fluid is transferred through the first transfer part and the second transfer part,
wherein the preheating part extends above the partition member in the vertical direction and is disposed to be preheated by the preheating device;
wherein the fluid purifying apparatus further comprises
a heater fixed to an outer wall of the second transfer part, and
a communication pipe disposed between the preheating device and the heater in the vertical direction, for communicating the second transfer part with the second reactor portion.

2. The fluid purifying apparatus as claimed in claim 1, wherein
a catalyst for accelerating oxidative decomposition of the organic matter is arranged within at least one of the first transfer part and the second transfer part.

3. The fluid purifying apparatus as claimed in claim 1, wherein
a catalyst for accelerating oxidative decomposition of the organic matter is arranged within the second transfer part.

4. The fluid purifying apparatus as claimed in claim 1, wherein
the solid storage part is arranged to be detachable from a main part of the reactor including the first transfer part and the second transfer part.

5. The fluid purifying apparatus as claimed in claim 1, wherein
an introduction pipe for introducing the fluid into the first transfer part is arranged to protrude downward in the vertical direction from an upper end wall of the first transfer part; and
a discharge port for discharging the fluid that has been transferred through the second transfer part is arranged at a position above a lower end of the introduction pipe, which is arranged within the first transfer part.

6. The fluid purifying apparatus as claimed in claim 4, wherein
   the solid storage part is arranged into a pipe structure that extends in the vertical direction and the solid storage part is connected to the main part of the reactor by a coupling.

7. The fluid purifying apparatus as claimed in claim 6, wherein
   the main part of the reactor and the solid storage part are connected via a valve part.

8. The fluid purifying apparatus as claimed in claim 7, further comprising:
   an open pipe, a storage part open valve, and a booster pump.

9. The fluid purifying apparatus as claimed in claim 1, further comprising:
   an accumulation level detection unit that detects an accumulation level of the solid matter stored within the solid storage part.

10. The fluid purifying apparatus as claimed in claim 7, wherein
    a first metal gasket is arranged between the main part of the reactor and the valve part, and a second metal gasket is arranged between the valve part and the solid storage part.

* * * * *